March 7, 1933.  G. K. LEWIS  1,900,824
MOLDING CONSTRUCTION FOR COMPOSITE PANELS
Filed Feb. 5, 1931
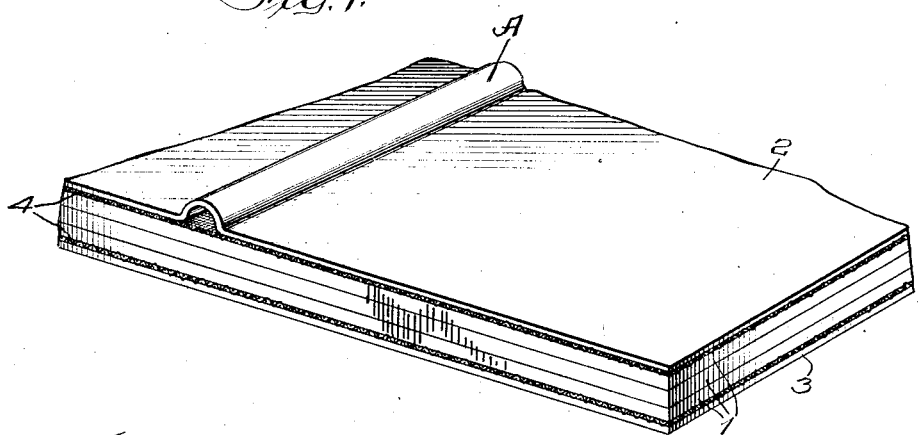
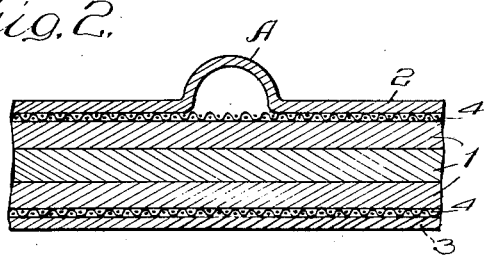
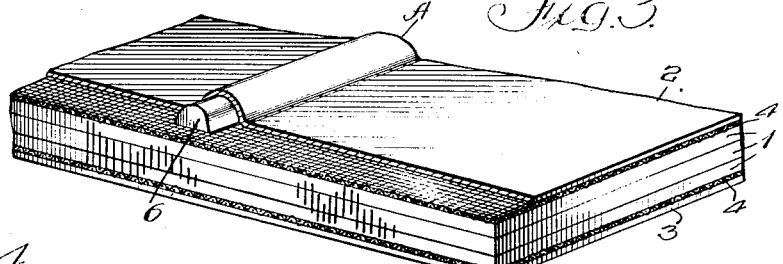
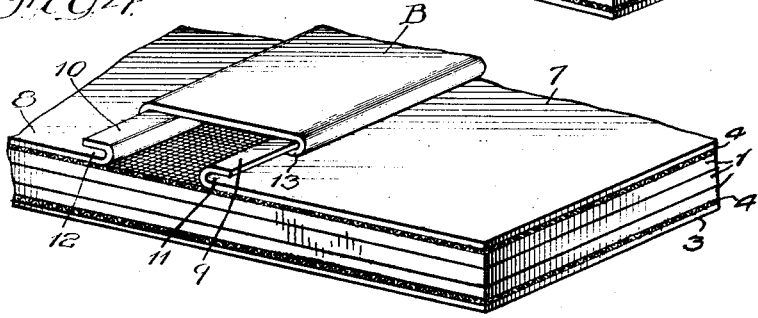
Inventor:
George K. Lewis Patented Mar. 7, 1933

1,900,824

UNITED STATES PATENT OFFICE

GEORGE K. LEWIS, OF CHICAGO, ILLINOIS, ASSIGNOR TO CARROL C. KENDRICK, OF CHICAGO, ILLINOIS

MOLDING CONSTRUCTION FOR COMPOSITE PANELS

Application filed February 5, 1931. Serial No. 513,654.

This invention relates to improvements in composite panels made up of metal and wood or fibrous laminations and has particular reference to the formation of ornamental moldings for panels of this type.

Panels of the type to which my invention is particularly applicable are composed of ply-wood laminations forming a core or body, and sheet metal laminations on the outer surfaces of the body. These panels are generally made flat and of uniform thickness, and when moldings are necessary for ornamental purposes and for concealing joints and the like, the moldings are generally in the form of separate strips or flattened tubular lengths fastened to the panel surfaces by means of bolts or wood screws.

In accordance with my invention, I propose to form the molding as an inherent part of the panel itself, and I accomplish this result by utilizing the metal sheathing of the panel itself in the formation of the molding.

Referring to the accompanying drawing, Fig. 1 is a perspective view of a portion of a flat composite panel having an ornamental molding formed therein, in accordance with my invention;

Fig. 2 is an enlarged detail section through a portion of the panel and molding;

Fig. 3 is a view similar to Fig. 1 of a modified structure; and

Fig. 4 is a perspective view similar to Fig. 1 of still another modified structure.

Composite panels of the type illustrated in the drawing are composed of a plurality of sheet metal and wood or fibrous laminations superposed upon each other and compressed into compact intimate relation to form a unitary structure. The core or body of these panels is made of a plurality of laminations or layers of wood or fibrous material 1 arranged with their grain angularly related to each other for strength, and secured together by glue or other suitable adhesive. On the faces of the body or core there is provided relatively thin sheet metal laminations 2 and 3 secured to the core by means of a layer of fabric 4, such as Canton flannel, which is glued to the face of the outer body lamination and to the inner surface of the sheet metal so as to serve as a bond to absorb vibration and to provide for any relative expansion and contraction of the various layers of the panel.

As before stated, in the manufacture of these panels the various laminations are generally formed perfectly flat and the panel made of uniform thickness throughout. In fabricating structures, such as vehicle bodies from these panels, it is desirable to finish off joints and to provide on the outer surfaces suitable molding for ornamental purposes. Heretofore it has been the practice to form the molding as separate strips or flat tubular members and to attach these moldings in place by means of bolts or screws extending through the molding and the panel structure. In accordance with my invention, however, I form the molding as an inherent part of the panel itself, and this is accomplished by forming the metal sheathing or outer lamination with an integral molding A before the sheathing is applied to the panel in the manufacture of the panel itself. While the cross-sectional shape of the molding may be of any desired contour, I have shown it in Figs. 1 to 3 as a simple half-round section for the purpose of illustration.

Before the sheet metal lamination 2 is applied to the outer side of the panel, it is provided with a raised or offset portion A of proper cross-sectional shape to form the desired type of molding and the lamination is then applied to the panel and compressed into intimate relation therewith in the same manner that a flat lamination would be handled. In this manner, the molding becomes an integral part of the panel and can be formed in the most effective way for the purpose at the factory. This is especially desirable where the parts of a complete vehicle body are manufactured at the factory and shipped to the customer in knocked-down condition. The advantage is that the customer has less labor and expense of assembling and a less number of small parts to attach than he would have if the moldings were separate.

In the structure shown in Fig. 3, a filler 6 may be provided, if desired. This filler can be made of either metal or wood, but preferably of wood, and is conformed to the shape of the molding in a manner to completely fill the interior space resulting from the formation of the molding. This is particularly desirable where composite laminated panels are used for the floor of the vehicle, and it is desirable to have series of ribs along the floor. The wood filler serves to add strength to enable the ribs to resist crushing pressure and also enables the end portions of the ribs to be conveniently formed at the ends thereof. The filler is preferably inserted in the molding ribs at the time the lamination is applied to the body of the panel in the manufacture thereof, although the filler can be inserted endwise into the molding or rib after the lamination has been applied to the panel. In either case, however, the complete structure can be made at the factory and the customer relieved of the necessity of fastening separate ribs or molding strips to the floor of the vehicle by bolts or screws.

In the structure shown in Fig. 4, the molding is not formed as a continuous portion of the sheet metal lamination, but instead the sheet metal lamination is divided into two parts 7 and 8, and the adjacent edges 9 and 10 thereof are doubled back in opposite directions to form slots 11. The molding B is formed as a separate piece of the proper cross-sectional shape to provide the desired contour for the molding. Its parallel edge portions 13 are doubled back toward each other on the strip to form channels for receiving the turned edges 9 and 10 of the sheet metal lamination of the panel, thereby interlocking the molding strip with the parts of the lamination. In this case, the two parts 7 and 8 of the lamination are formed with turned edges and the parts then applied to the panel. The molding strip B can then be slipped longitudinally along the joint with its turned edges in interlocked relation to the turned edges 9 and 10; or, if desired, the strip can be interlocked with the edges of the lamination and the assembly then applied to the body of the panel in the usual manner.

This structure is advantageous to the manufacturer because it enables the manufacturer to use and assemble smaller sheets of sheet metal for laminations and enables a greater variety of shapes to be obtained in forming the molding strip B. However, even though the strip B is a separate piece, it is made up as a part of the panel at the factory and becomes an inherent part of the panel, hence making it unnecessary for the customer to handle or assemble separate molding strips when assembling the vehicle body parts.

It is to be understood that changes may be made in the construction and arrangement of the parts without departing from the spirit of the invention, and I contemplate such changes as fairly fall within the slope of the appended claims.

I claim:
1. A composite panel comprising body laminations of fibrous material and a sheet metal lamination on the outer surface thereof glued together in flat formation to form a unitary structure, said outer sheet metal lamination having embossed therein an integral portion shaped as a molding and raised beyond the surface of the plane of the sheet metal lamination on the opposite side of the fibrous body.

2. A composite panel for vehicle body construction comprising body laminations of fibrous material and a sheet metal lamination on the outer surface thereof, said laminations being glued together and compressed in flat formation to form a unitary structure of relatively large area, said sheet metal lamination having embossed therein an integral portion shaped as a molding and raised beyond the surface of the plane of the sheet metal lamination on the opposite side of the fibrous body, and a filler member disposed in a space between said raised molding portion and the body of the panel and forming a strengthening member for said molding portion.

GEORGE K. LEWIS.